United States Patent
Kodaira et al.

[11] Patent Number: 6,066,801
[45] Date of Patent: May 23, 2000

[54] CABLE TELEVISION/TELEPHONE TAP

[75] Inventors: Makoto Kodaira, Setagaya-ku; Jun Kimura, Kashiwa; Michiharu Takahashi, Yachiyo, all of Japan

[73] Assignee: Uro Denshi Kogyo Kabushiki Kaisha, Tokyo-To, Japan

[21] Appl. No.: 09/034,779

[22] Filed: Mar. 4, 1998

[30] Foreign Application Priority Data

Mar. 5, 1997 [JP] Japan .................................. 9-050109

[51] Int. Cl.⁷ ............................................ H02G 7/00
[52] U.S. Cl. .................... 174/41; 174/60; 174/65 SS; 220/3.92; 220/3.94
[58] Field of Search .................... 174/41, 50, 59, 174/60, 65 R, 65 SS; 220/3.92, 3.94

[56] References Cited

U.S. PATENT DOCUMENTS

| | | | |
|---|---|---|---|
| 1,302,137 | 4/1919 | Cook | 174/60 X |
| 3,129,396 | 4/1964 | Germain et al. | 174/50 X |
| 3,585,273 | 6/1971 | Paul | 174/65 R |
| 4,256,920 | 3/1981 | Ayers et al. | 174/65 R |
| 4,513,171 | 4/1985 | Suffi et al. | 174/60 X |
| 4,605,815 | 8/1986 | Wilson | 174/59 X |
| 4,654,470 | 3/1987 | Feldman et al. | 174/50 |
| 4,980,516 | 12/1990 | Nakagawa | 174/35 GC |
| 5,202,536 | 4/1993 | Buonanno | 174/35 GC |
| 5,247,135 | 9/1993 | Rebers et al. | 174/60 X |
| 5,360,945 | 11/1994 | Truesdale, Jr. et al. | 174/65 R X |
| 5,408,740 | 4/1995 | Dee | 174/65 R X |
| 5,925,851 | 7/1999 | Sugahara | 174/65 G |

*Primary Examiner*—Dean A. Reichard
*Attorney, Agent, or Firm*—Ladas & Parry

[57] ABSTRACT

There is provided a cable television/telephone tap, which can be set at a given position on a coaxial cable, and which is capable of practically and economically supplying a telephone service simultaneously with a cable television service, and also of quickly and economically accommodating expansions, replacements and modifications to the system. A cable television/telephone tap, using coaxial cables for splitting high-frequency signals and current for telephones and then supplying the same to subscribers includes a plurality of enclosures 1 and 2, having at least an upper side enclosure and a lower side enclosure; a branch terminal 9 for the high-frequency signals for the subscribers, which is provided on either the upper side enclosure or the lower side enclosure of a fully united enclosure wall; through-holes 7, which are provided on the same enclosure wall as the branch terminal; current-splitting wires which feed the current for telephones, the current-splitting wires being inserted through the through-holes; and a partition 43, which is provided around the through-holes in the enclosure wall, so as to assist the enclosure in surrounding the through-holes.

8 Claims, 11 Drawing Sheets

CABLE TELEVISION/TELEPHONE TAP

BACKGROUND OF THE INVENTION

1. Field of the Invention

The present invention relates to a cable television/telephone tap, and more particularly to a cable television/telephone tap for transmitting TV high-frequency signals to subscribers from a coaxial cable TV signal transmission system installed in general homes, communal housing, offices and the like, while simultaneously supplying low-frequency current to telephones, either in a multiplexed format on the coaxial cables, or by means of current-splitting wires provided separately from the coaxial cables.

2. Description of the Related Art

A typical example of a conventional device for directing high-frequency signals from a coaxial cable signal transmission system to electronic apparatuses is a tap-off. Tap-offs are widely used in cable television or joint TV viewing facilities in communal housing. This type of system and device will next be explained.

FIG. 9 is a schematic diagram of a CATV communal reception facility utilizing a conventional TV signal tap. In FIG. 9, 101, 102, 103 and 104 are groups of antennas for receiving TV signals, wherein 101 and 102 are parabola antennas for CS reception at superhigh frequency, 103 is an antenna for ground wave reception at very high frequency, and 104 is an antenna for ground wave reception at ultra-high frequency.

All TV signals received by these antenna groups are led to a mixing amplifier 121 by means of coaxial cables 105, 106, 107 and 108. In addition, in a CATV viewing reception facility 120, video-taped programs from VTRs 122, 123 and 124 are level-adjusted and shaped by a mixer 125 and then led along coaxial cables to the input of the mixing amplifier 121. After output has been set at a predetermined level, the video signals are input to a trunk amplifier 131.

Furthermore, a branch amplifier 132 comprises four splitters, but here CATV signals split into four equal portions are fed through coaxial cables, to which taps have been connected in multiple levels, and are transmitted to all TV viewers by tap-offs 133 and 134.

In this case, all the antennas, mixers, amplifiers, VTRs, channel-changers, monitors and the like are effectively united in a single system, in the nature of a head terminal. The term "headend" customarily denotes all these apparatuses inclusively.

Electrically speaking, a conventional CATV tap-off is a device which uses a directional coupler to couple one portion of a high-frequency signal, which has been input to the input terminal, to a branch terminal, and outputs the remaining portion of the signal directly. This constitutes a hybrid circuit, wherein high-frequency signal entering from the output terminal side are sent to the input side without being coupled to the branch terminal, in order to prevent the admission of noise generated by TVs which are positioned further down the communications line than the tap-off. The usual frequency band is approximately 5–1,000 MHz.

FIG. 10 is a schematic view of a configuration of a conventional CATV tap. As FIG. 10 shows, an input terminal 151, to which the inner conductor of a coaxial cable is connected, leads high-frequency signals inside an enclosure. The inner conductor is insulated by means of a metallic case 152 comprising upper and lower parts which are linked together. The external conductor of the coaxial cable is connected to the enclosure on the input side by the input terminal 151 and a coaxial cable connector shell 154. An output terminal, having a similar configuration to the input terminal 151, is provided on the opposite side of the enclosure to the input terminal 151.

Branch terminals 153 are extracted by connectors on the surface of the lower part of the enclosure 152, with the inner conductor still in an insulated state. These are connected in an exposed state to messenger wire strung between utility-line poles along roads and the like, generally by screwing the strand wire into a strand clamp 155, which has a screw-hole of specified dimensions.

Such conventional taps are only capable of splitting signals within a frequency band of approximately 5–1,000 MHz, and cannot be used for CATV telephone services, which are expected to proliferate in the near future.

However, as FIG. 11 shows, since power current from an amplifier flows through the trunk line which is connected to the input/output terminal I/O, a method is envisaged in which, in addition to branching high-frequency signals by means of a directional coupler DC and a splitter SP, choke coils L are used to divert current from the trunk line, and this current is then multiplexed with the high-frequency signals and split-fed to user terminal B. Some of the problems affecting this type of system are listed below.

1. Approximately 200 mA of current must be supplied to each subscriber, but branch terminals in conventional taps suffer from unreliable core contacts when used over a long period.
2. Since choke coils L, the number of which corresponds to the number of subscribers, are inserted on the trunk line in parallel, the high-frequency transmission properties of the trunk line may be adversely affected by resonance caused by coupling between the choke coils L.
3. Devices at the subscriber end require an apparatus capable of separating the high-frequency signals from the low-frequency current for telephones.
4. When a subscriber wishes to cancel his telephone subscription while continuing to subscribe to the TV reception service, it may be necessary to temporarily cut off the telephone and TV services of other subscribers as well in order to implement this.
5. With the additional devices mentioned in points 2, 3 and 4 above, the side of the tap is noticeably greater than conventional taps, making handling of the tap inconvenient.

SUMMARY OF THE INVENTION

The present invention has been accomplished after consideration of the above points and aims to provide a cable television/telephone tap which can be set at a predetermined place on a coaxial cable, and which is capable of practically and economically providing a cable television service and a telephone service simultaneous thereto, in addition to being capable of responding quickly and economically to expansions, replacements and modifications in/to the system.

In order to achieve the above objectives, the present invention comprises a cable television/telephone tap, using coaxial cables to split high-frequency signals and current for telephones and supply said high-frequency signals and said current for telephones to subscribers, said cable television/telephone tap comprising a plurality of enclosures which are combined together, said enclosures including at least an upper side enclosure and a lower side enclosure; branch terminals of said high-frequency signals for said subscribers, said branch terminals being provided on a single wall of either one of said upper side enclosure and said lower side enclosure; through-holes for inserting current-splitting wires which feed said current for telephones, said through-holes being provided on a same enclosure wall as said branch terminals; and a partition, said partition being provided around said through-holes in said enclosure wall so as to assist said enclosure in surrounding said through-holes.

Another aspect of the cable television-telephone tap of the present invention further comprises a compressible filler, said compressible filler being provided in said through-holes.

Furthermore, in another aspect of the cable television/telephone tap of the present invention, said compressible filler comprises a high polymer compound.

Furthermore, in another aspect of the cable television/telephone tap of the present invention, said high polymer compound comprises silicon rubber which hardens at room temperature.

Furthermore, another aspect of the cable television/telephone tap of the present invention further comprises a pressure board for applying pressure to said compressible filler.

Furthermore, in another aspect of the cable television/telephone tap of the present invention, said compressible filler comprises a high polymer compound into which a powdered magnetic substance has been scattered.

Yet another aspect of the cable television/telephone tap of the present invention further comprises a window for connecting said current-splitting wires, said window being provided on a different enclosure to an enclosure in which said through-holes for current-splitting wires are provided.

Furthermore, another aspect of the cable television/telephone tap of the present invention further comprises a window for connecting said current-splitting wires; said window being provided on a same enclosure to an enclosure in which said through-holes for current-splitting wires are provided.

Furthermore, a final aspect of the present invention comprises a cable television/telephone tap, using coaxial cables to split high-frequency signals and current for telephones and supply said high-frequency signals and said current for telephones to subscribers, said cable television/telephone tap comprising a plurality of enclosures which are combined together, said enclosures including at least an upper side enclosure and a lower side enclosure; and a window for connecting said current-splitting wires, said window being provided on any one of said plurality of enclosures.

For a more complete understanding of the present invention and the advantage thereof, reference is now made to the following description taken in conjunction with the accompanying drawings.

DESCRIPTION OF THE PREFERRED EMBODIMENTS

Figure 1:
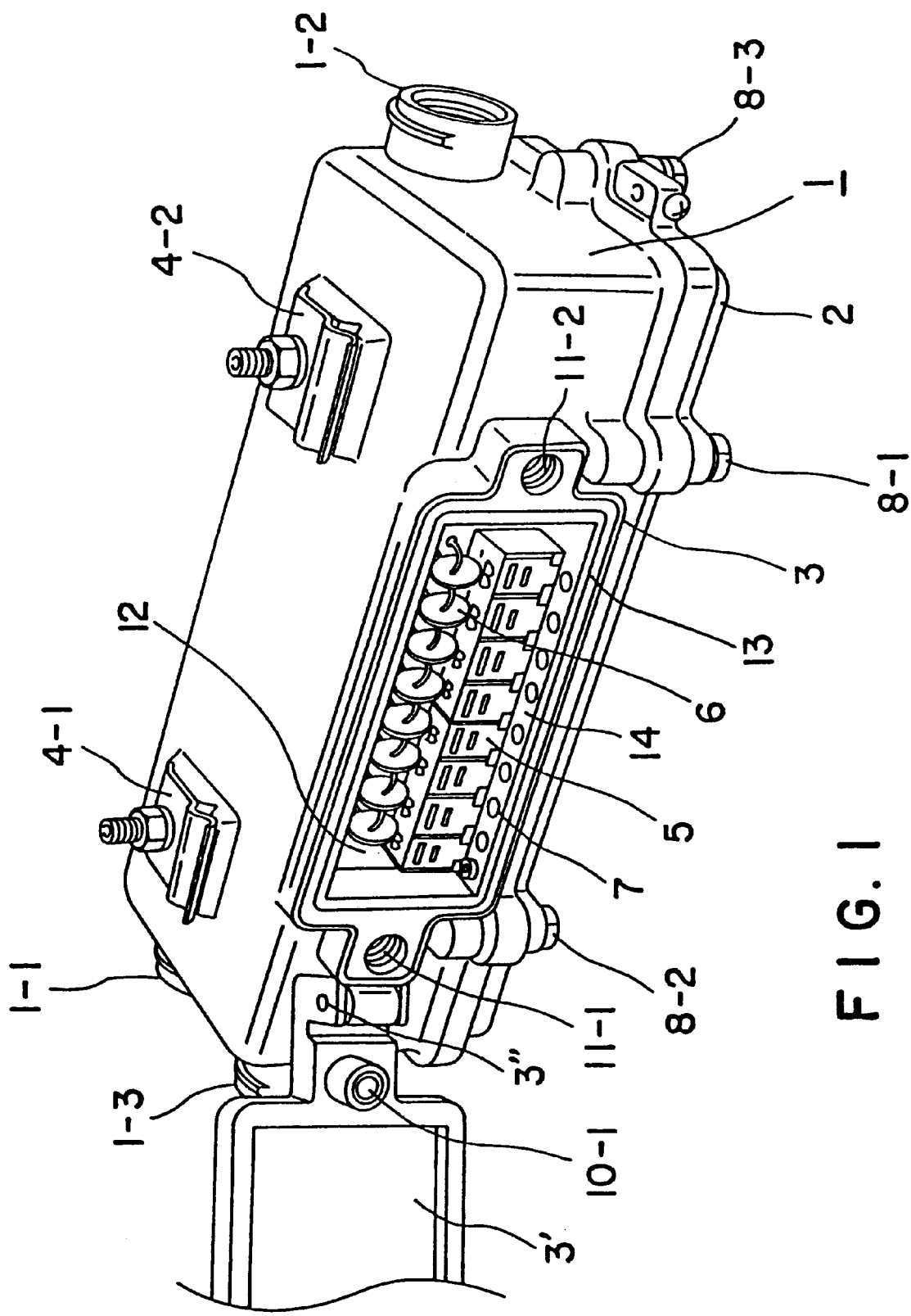
FIG. 1 is a perspective view of the outside of a first embodiment of the present invention.

FIG. 1 is a perspective view of the exterior of a first embodiment of the present invention, showing the state as seen from diagonally above upper side enclosure 1. The upper side enclosure 1 has three terminals, namely input terminals 1-1, 1-2 and 1-3. Furthermore, a pair of strand clamps 4-1 and 4-2, for suspending the device from messenger wire, are provided thereabove. A lower side enclosure 2 is secured to the upper side enclosure 1 by means of uniting bolts 8-1, 8-2 and 8-3. There are three other similar bolts for uniting, but these are not shown in FIG. 1.

A window 12 is provided in one side of the upper side enclosure 1 and is enclosed by a flange 3. The operations of connecting and disconnecting connectors 5 for current-splitting wires, which are provided on the lower side enclosure 2, and attaching and detaching current-restricting elements 6 are carried out from this window 12. The window 12 has a door 3' supported by a hinge 3". This door 3' is provided with bolts 10-1 and 10-2 (not shown), which are fitted in a fallout-proof structure, and is secured to the window 12 by screwing these bolts into threads 11-1 and 11-2, which are provided on the outer side of the flange 3 on the upper side enclosure 1.

The flange 3 is provided with a waterproof gasket 13 which ensures the waterproof structure of the door 3' and the upper side enclosure 1. In addition, electromagnetic shielding can be strengthened by providing a metallic mesh gasket (not shown in FIG. 1) to the inside of the waterproof gasket 13.

A pressure board 14 applies pressure to a compressible filler, comprising a high polymer compound, which is disposed inside the operation window 12. Through-holes 7, through which current-splitting wires are passed, are provided in the pressure board 14. As with the connectors for current-splitting wires, the number of through-holes 7 is the same as the number of high-frequency signal branch terminals.

Figure 2:
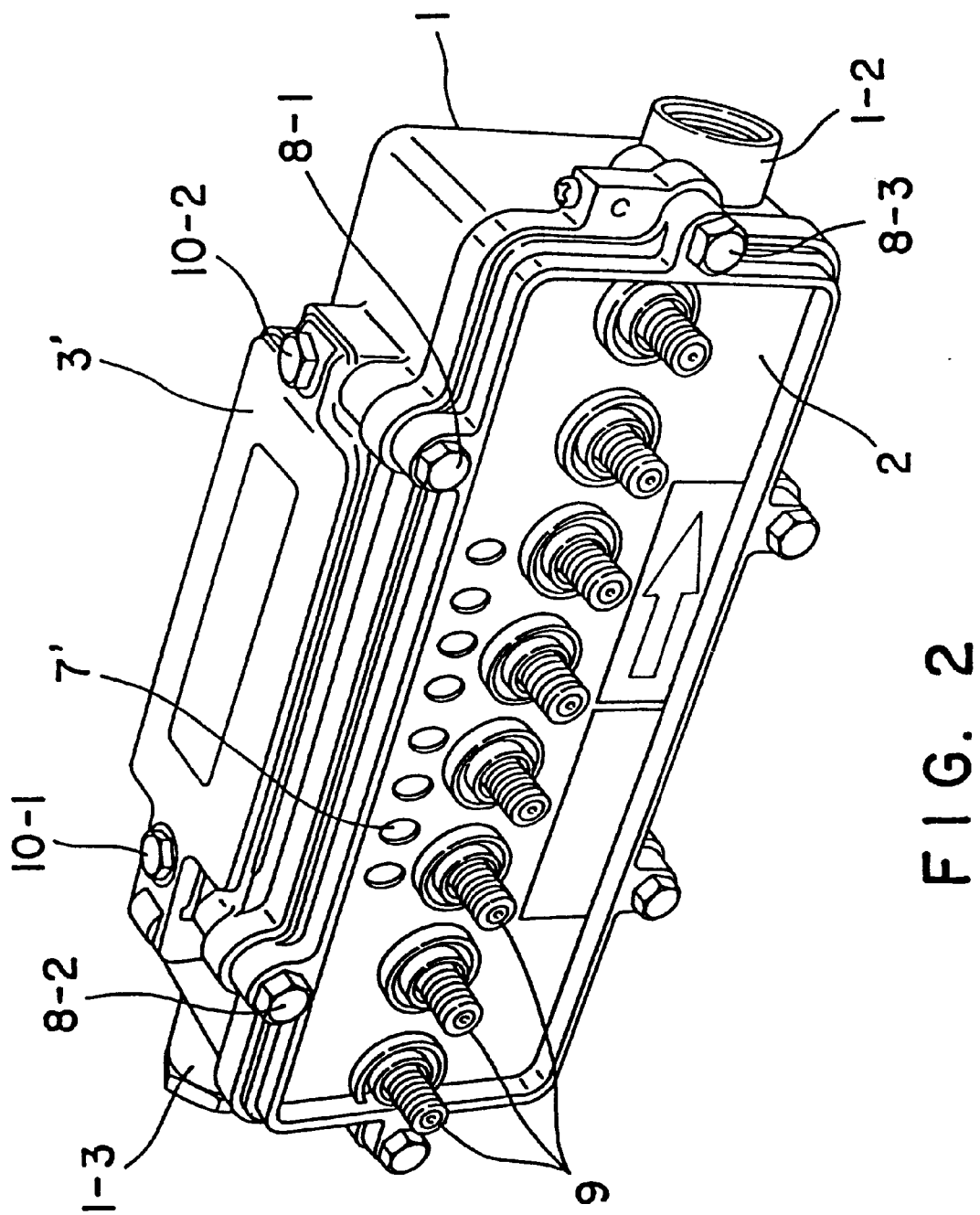
FIG. 2 is a perspective view of the embodiment of FIG. 1 as seen from the underside.

FIG. 2 is a perspective view of the embodiment of FIG. 1 as seen at roughly the same angle from the underside. More specifically, FIG. 2 depicts the outside of the lower side enclosure 2. As the diagram shows, eight branch terminals for high-frequency signals 9 are provided in a straight-line in the center. Furthermore, through-holes 7, through which current-splitting wires are passed, are provided on the lower side enclosure 2 at positions corresponding to the through-holes 7 in the pressure board 14 for applying pressure to the high polymer compound which was depicted in FIG. 1.

Figure 3:
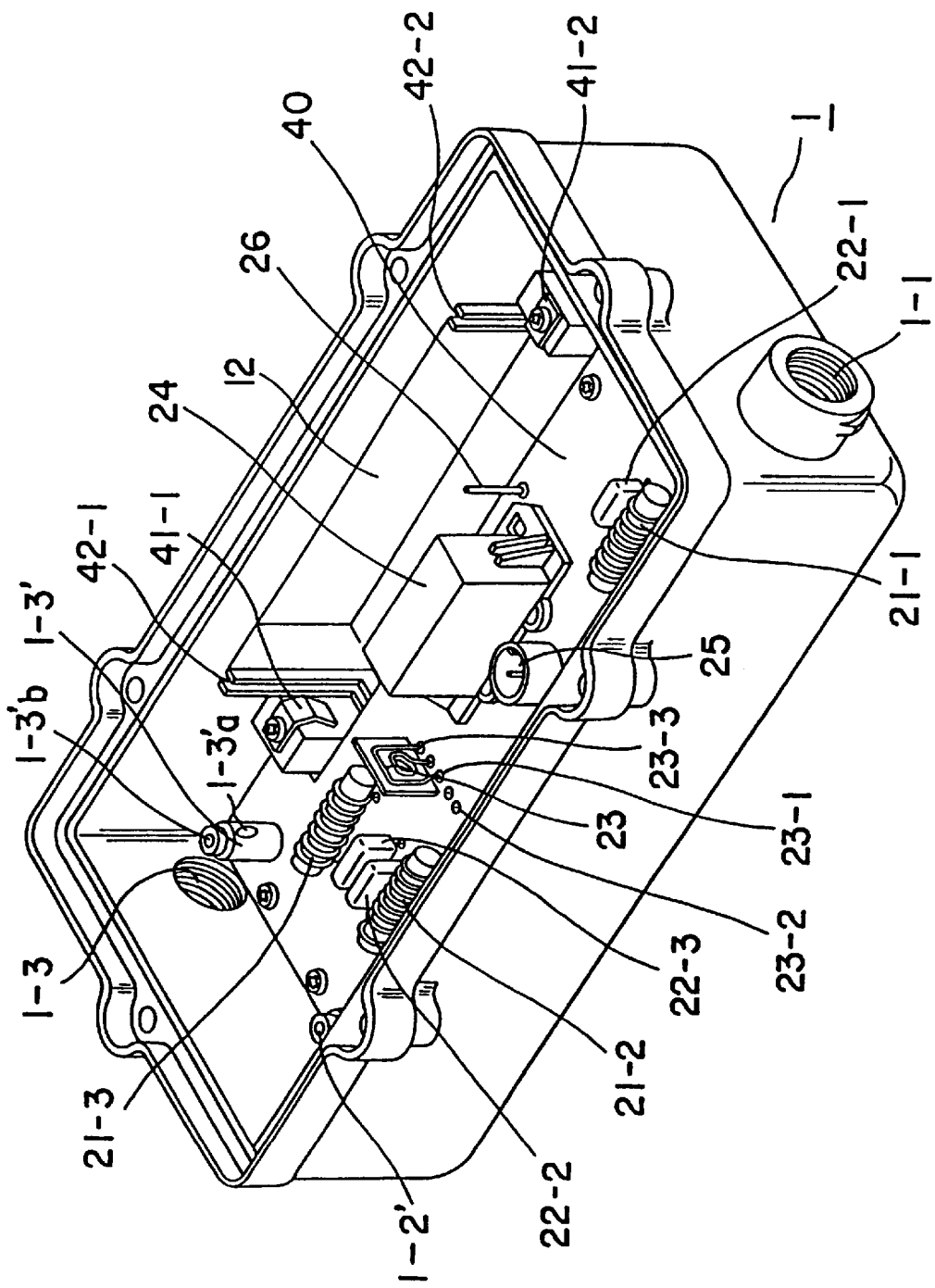
FIG. 3 is a perspective view of the internal configuration of the upper enclosure of the embodiment of FIG. 1.

FIG. 3 is a perspective view of the internal configuration of the upper side enclosures 1 of the embodiment of FIG. 1.

The input and output terminals in FIG. 3 will next by explained taking as examples input and output terminals 1-1–1-3.

The input and output terminals are formed by cutting threads into the upper side enclosure 1 and then screwing connectors, which are shaped for fitting trunk wires, into these threads from the outer side of the enclosure. After a core wire has been inserted into a through-hole 1-3a of a contact post 1-3a' it is clamped by a straight screw 1-3a. Furthermore, a printed wiring board 40 comprising a variety of electrical components is attached to the ceiling of the upper side enclosure 1 using screws.

The most important of the electrical components provided on the printed wiring board 40 include choke coils 21-1, 21-2 and 21-3, for impeding the passage of high-frequency signals, and capacitors 22-1, 22-2 and 22-3, for permitting the passage of high-frequency signals. In addition, a jumper plug 23 for high-frequencies comprising the printed wiring board 40 and three leads is installed by plugging the leads into sockets which have been soldered onto the printed wiring board 40. Of these three leads, the two outer leads are connected to the printed wiring board 40, while the center lead is used as an earth pattern for matching the impedance at high frequencies.

Socket 23-1, into which the jumper plug 23 is plugged, is connected to the input/output terminal 1-1 via a circuit pattern and a capacitor 22-1 which are not shown in the diagram. Similarly, socket 23-2 is connected to the input/output terminal 1-2 via a capacitor 22-2, and socket 23-3 is connected to the input/output terminal 1-3 via a capacitor 22-3. In addition, a further two sockets are connected to the earth pattern of the printed wiring board 40. Therefore, by selecting whether to plug the jumper plug 23 so that a short circuit is established between socket 23-1 and socket 23-2, or between socket 23-1 and socket 23-3, it is possible to switch between an aerial mount and a pedestal mount.

A directional coupler 24 is provided in the center of the printed wiring board 40 and the perimeter of this directional coupler 24 is covered by a shield. The directional coupler 24 is plugged into a socket provided on the printed wiring board 40, but since the directional coupler 24 has a bisymmetrical structure, the direction of high-frequency signals can be altered depending on how the directional coupler 24 is plugged into this socket.

A sliding coaxial connector for high frequencies, which connects the upper side enclosure 1 to the lower side enclosure 2, is provided beside the directional coupler 24. Connection is achieved by sliding the outer screw portion of the female side 25 of the coaxial connector shown in FIG. 4 into the male side 25 of the coaxial connector.

The printed wiring board 40 further comprises a male side pin 26 of a connector for carrying telephone current to electrical circuits of the lower side enclosure 2. The pin 26 is connected to a female side socket provided in the partition 43 shown in FIG. 4. However, this socket is not shown in the diagram.

In the cable television/telephone tap of the present invention, in order to alter the amount of high-frequency splitting (tap value) after the system has been set up and energized, the lower side enclosure 2 is removed while the system is in the energized state. In this case, even when the upper side enclosure 1 and the lower side enclosure 2 are separated, if the coaxial connector for telephone current 26 is still connected, there is the danger that electricity might flow through the hand of a person who is holding the lower side enclosure 2 to the earth, causing an electric shock. Such an electric shock is prevented by means of metallic spring pieces for contact 41-1 and 42-2, which remain in contact with the outer sides of partitions 43-1 and 43-2 (to be explained later) until the lower side enclosure 2 has been completely removed, thereby preventing earth current from flowing into the case of the upper side enclosure 1. In addition, a metallic mesh gasket (not shown) may be inserted into grooves 42-1 and 42-2 in order to further increase the shield effect.

Figure 4:
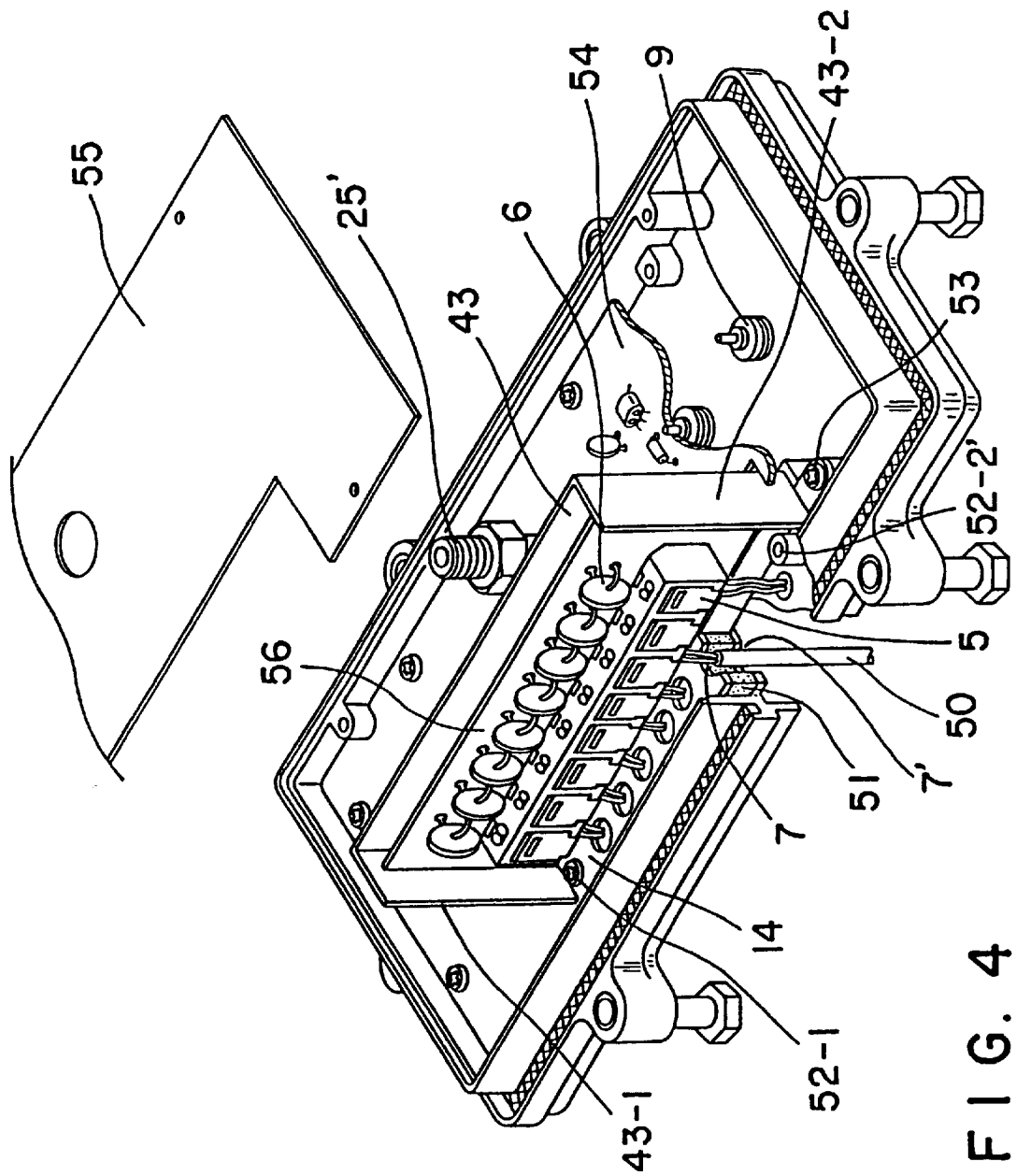
FIG. 4 is a perspective view of the internal configuration of the lower enclosure of the embodiment of FIG. 1.

FIG. 4 is a perspective view of the internal configuration of the lower side enclosure 2 of the embodiment of FIG. 1, depicting a case in which eight high-frequency signal output terminals are provided on the inside of the lower side enclosure 2. To facilitate understanding of this configuration, one portion is shown in cross-section.

As FIG. 4 shows, a printed wiring board 54 is provided on the lower side enclosure 2 parallel to a low partition. This printed wiring board 54 comprises splitters and capacitors which will be explained later with reference to FIG. 6. The printed wiring board 54 is covered with a metal plate 55 to improve the shield effect between the upper side enclosure 1 and the lower side enclosure 2.

Furthermore, a printed wiring board 56 is secured to a partition 43 comprising a conductive material, which is provided on the inside of the lower side enclosure 2. Current-restricting elements 6 and current-splitting terminals are provided on the printed wiring board 56. The partition 43 is inserted into grooves 42-1 and 42-2 in the lower side enclosure 2 and is secured therein by means of screws 53 (not all of which are shown in the diagram).

Thus both side portions 43-1 and 43-2 of the partition 43 of the lower side enclosure 2 fit into the grooves 42-1 and 42-2 of the upper side enclosure 1. When the upper side enclosure 1 and the lower side enclosure 2 are joined together, the two enclosures 1 and 2 connect, thereby electrically shielding the area between the inner portion of the upper side enclosure 1 and the opening of window 12.

Current-splitting wires 50, for splitting telephone current, are connected to the printed wiring board 56 which is supported by the partition 43. These current-splitting wires 50 connect to the connectors for current-splitting wires 5 and the current-restricting elements 6. In order to connect to the connectors for current-splitting wires 5, the current-splitting wires 50 pass through the through-holes 7 in the lower side enclosure 2, through a rubber gasket 51 and through the through-holes 7 in the pressure board 14. Since the holes in the gasket 51 have a diameter which is slightly smaller than the outer diameter of the current-splitting wires 50, the current-splitting wires 50 are press-fitted through the holes.

Furthermore, since the pressure board 14 is compressed by screws 52-1 and 52-2 (not shown in the diagram), the area between the lower side enclosure 2 and a packing 51, which comprise a compressible material such as a high polymer compound, is kept pressurized in order to ensure that the structure is waterproof. Moreover, the pressure board 14 is brought into even closer contact with the current-splitting wires 50 as a result of the compression of the packing 51. The high polymer compound may, for instance, comprise silicon rubber which hardens at room temperature, which may in addition be mixed with a powdered magnetic material. This produces excellent waterproofing effects, even when the diameters of the current-splitting wires 50 are different.

Figure 5:
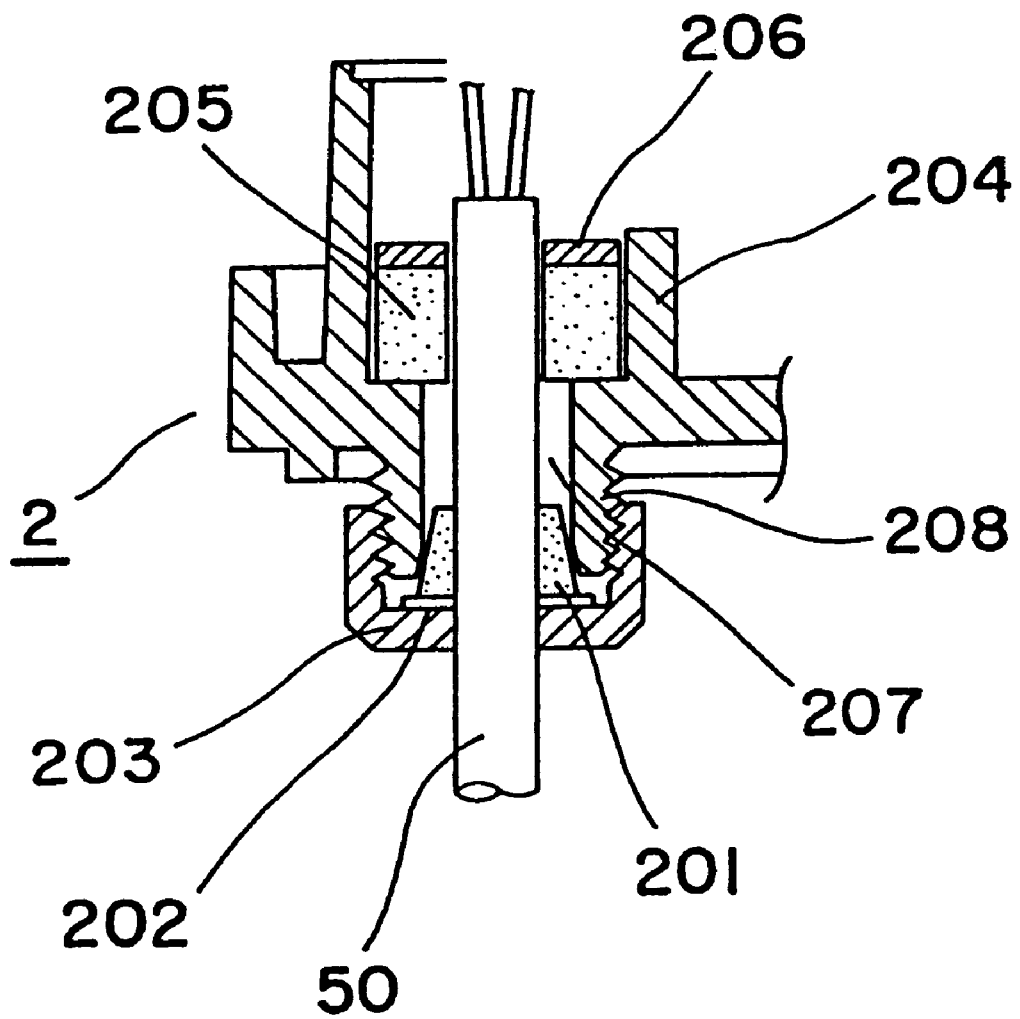
FIG. 5 is a cross-sectional view of an example of a waterproof structure applied in the embodiment of FIG. 1.

FIG. 5 is a cross-sectional view of a portion of another example of a waterproof structure which can be applied in the embodiment of FIG. 1. As FIG. 5 shows, the current-splitting wire 50 passes through a rubber stopper 201, which has a through-hole of roughly the same diameter as the wire, and then passes through a through-hole 207 which is provided in a rising portion 204 of the lower side enclosure 2. The through-hole 207 of the rising portion 204 extends cylindrically towards the outside. In addition, screws have been cut into the outer rim of the through-hole 207. The rubber stopper 201, which the current-splitting wire 50 has been inserted through, is fastened by means of a washer 202 and a cap 203 so as to contact firmly against the current-splitting wire 50 and against the inner wall of the through-hole 207 of the rising portion 204 of the lower side enclosure 2, whereby an excellent waterproof effect is achieved. The current-splitting wire 50 next passes through a magnetic material 205 and a pressure board 206 on the inside of the rising portion 204 of the lower side enclosure 2, enabling a magnetic shield effect to be achieved.

Figure 6:
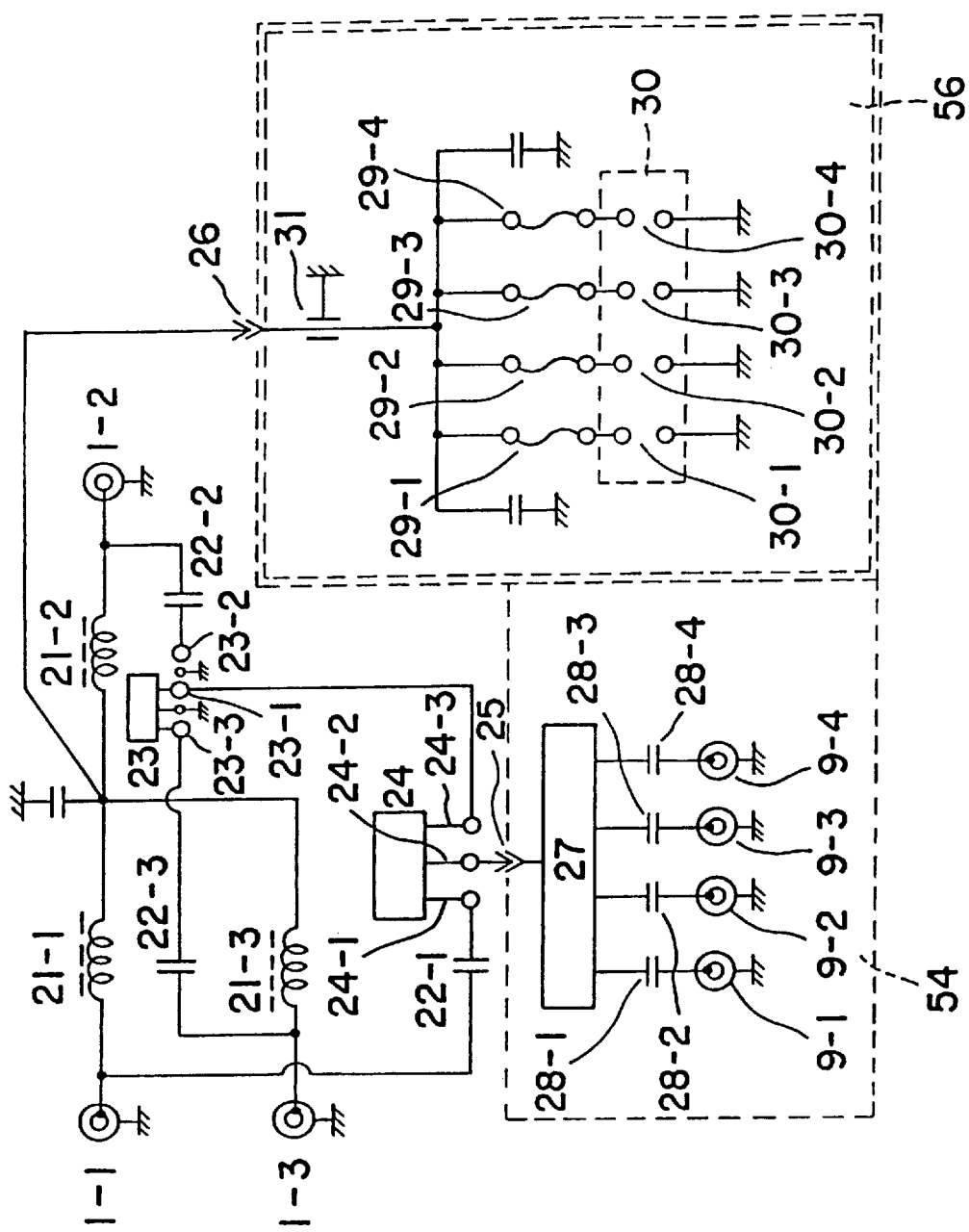
FIG. 6 is a circuit diagram showing the circuit configuration of the embodiment of FIG. 1.

FIG. 6 shows the circuit configuration of an example in which the first embodiment of FIG. 1 comprises four output terminals for high-frequency signals, thereby illustrating the circuit configuration of the cable television/telephone tap of the present invention.

As FIG. 6 shows, input/output terminals 1-1, 1-2 and 1-3 are connected to high-frequency trunk cables. Choke coils 21-1, 21-2 and 21-3, which are provided along the trunk cables, impede the flow of high-frequency signals by presenting a high impedance thereto, and permit the flow only of low-frequency current for telephones. By contrast, capacitors 22-1, 22-2 and 22-3 permit the flow of high-frequency signals through the trunk line, while impeding the flow of low-frequency current for telephones by presenting a high impedance to low-frequencies.

The two principal methods of installing a cable television/telephone tap are the "aerial mount" in which the tap is generally mounted on messenger wire strung between utility-line poles, and the "pedestal mount" used when the cables are buried underground, in which the tap is generally mounted on pedestal box.

In an aerial mount, the trunk coaxial cable is connected to the input/output terminals 1-1 and 1-2, and a waterproof cap is fitted to the input/output terminal 1-3. Alternatively, in a pedestal mount, a waterproof cap is fitted to the input/output terminal 1-2. In both aerial and pedestal mounts, jumper plugs 23 for high-frequencies are provided in order to switch the lines along which the high-frequency waves pass.

The directional coupler 24 comprises an input terminal 24-1 functioning as a directional coupler, a splitting terminal 24-2 for a directional coupler, and an output terminal 24-3 functioning as a directional coupler. The directional coupler 24 is a plug-in unit and is plugged into a socket on a printed board having choke coils 21 and capacitors 22. Therefore, when a high-frequency signal flows from input/output terminal 1-2 toward input/output terminal 1-1, by plugging the directional coupler 24 in the opposite way round it becomes possible to accommodate the flow of the trunk signal without needing to reconnect the input/output terminals 1-1 and 1-2.

FIG. 6 shows a case in which the directional coupler input terminal 24-1 is connected to the side of the capacitor 22-1, and the directional coupler output terminal 24-3 is connected via the jumper plug 23 on the side of the capacitor 22-3. In other words, FIG. 6 shows a pedestal mount comprising cable television/telephone tap input terminal 1-1 and output terminal 1-3.

Furthermore, the high-frequency coaxial connector 25 connects the splitting terminal of the directional coupler 24 to the splitter 27 on the printed wiring board which is provided in the lower side enclosure. FIG. 6 shows a four-way split, in which the direct current portion of each split output is blocked by the four capacitors 28-1–28-4 and only high-frequency signals are connected to the four output terminals 9-1–9-4.

Current for telephones is extracted from the connection points of choke coils 21-1, 21-2 and 21-3. The current for telephones then passes along a connector 26, which separates the upper side enclosure 1 and the lower side enclosure 2, via a through capacitor 31, through current restricting elements 29-1–29-4 (namely, the current-restricting elements 6 in FIG. 4) provided on the printed wiring board, and is finally connected to a connector for splitting current 30 (namely, the connectors for current-splitting wires 5 in FIG. 4). One side of the connectors for splitting current 30 connects to earth.

The current restricting elements 29, which are individually connected to the connectors for splitting current 30, block overcurrent in the various devices, and thereby serve to protect the system and the cable television/telephone taps in the event of an excess flow of current resulting from, for instance, a short on the terminal side or the like. The current restricting elements 29 are plugged into sockets on the printed wiring board of the lower side enclosure. For subscribers who wish to subscribe to CATV but not to the telephone service, these current restricting elements 29 can also be used as switches by unplugging them as appropriate so as not to send current for telephones to non-subscribers.

In FIG. 6, the components contained in the portion of the diagram which is not surrounded by a dotted line are installed on the printed wiring board in the upper side enclosure, and the components in the dotted line and double dotted line portions are contained in the lower side enclosure.

Components within double dotted lines are installed on the printed wiring board 56 of FIG. 4.

Figure 7:
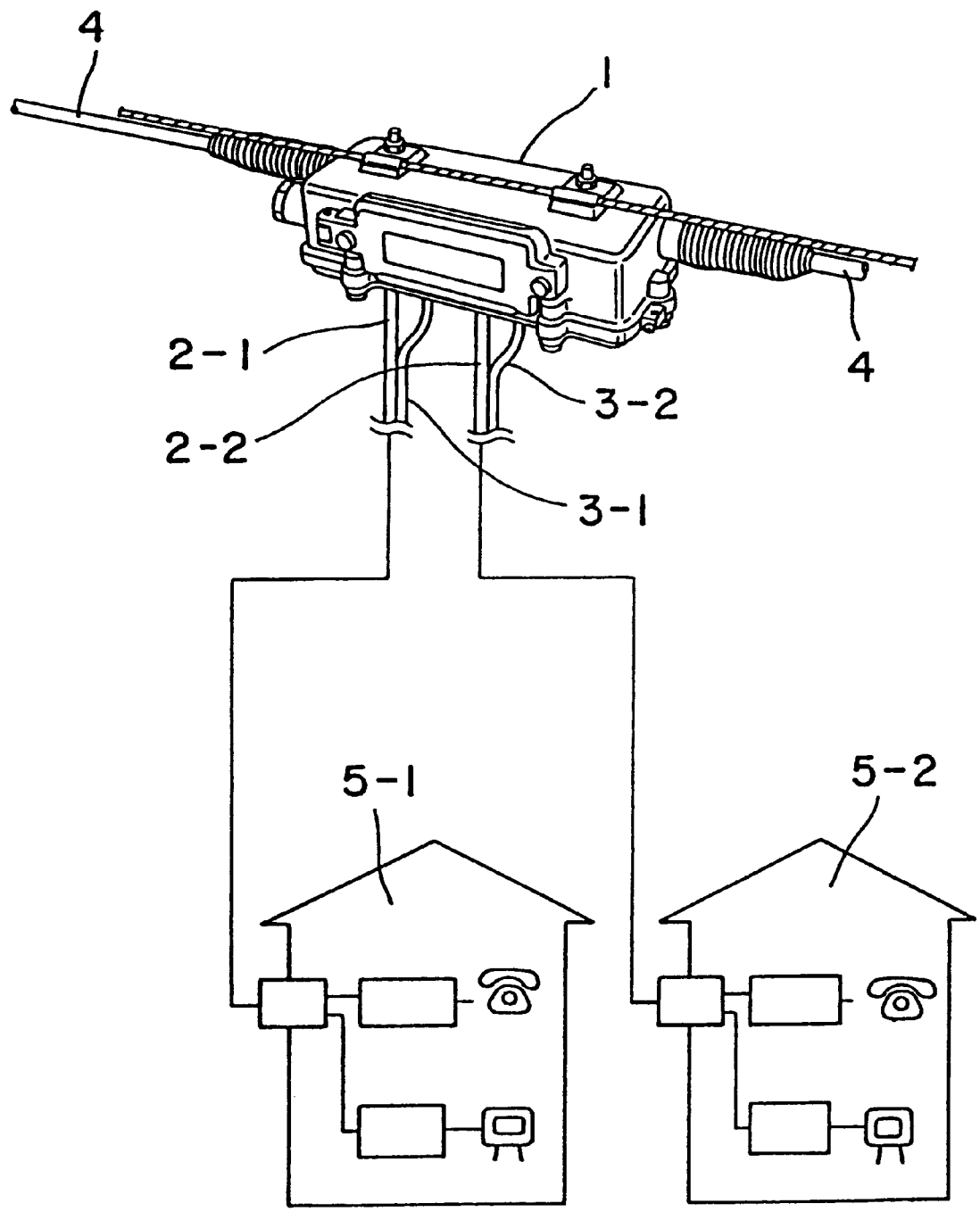
FIG. 7 is a schematic view of an example configuration of a CATV system using the embodiment of FIG. 1.

FIG. 7 is a schematic view of a configuration of a CATV system using the embodiment of FIG. 1, depicting an example case where, in addition to conventional television signals, tap-off 1 using a conventional CATV line supplies signals for telephones and current for telephones to subscribers.

In addition to all television and telephone signals, electrical power for telephones is also multiplexed on the trunk line 4. Television and telephone signals are split at the tap-off 1 and transmitted to subscriber houses 5-1 and 5-2 via coaxial cables 2-1 and 2-2. The power for telephones is split at the tap-off 1 and transmitted to subscriber houses via power splitting wires 3-1 and 3-2.

Embodiment 2

Figure 8:
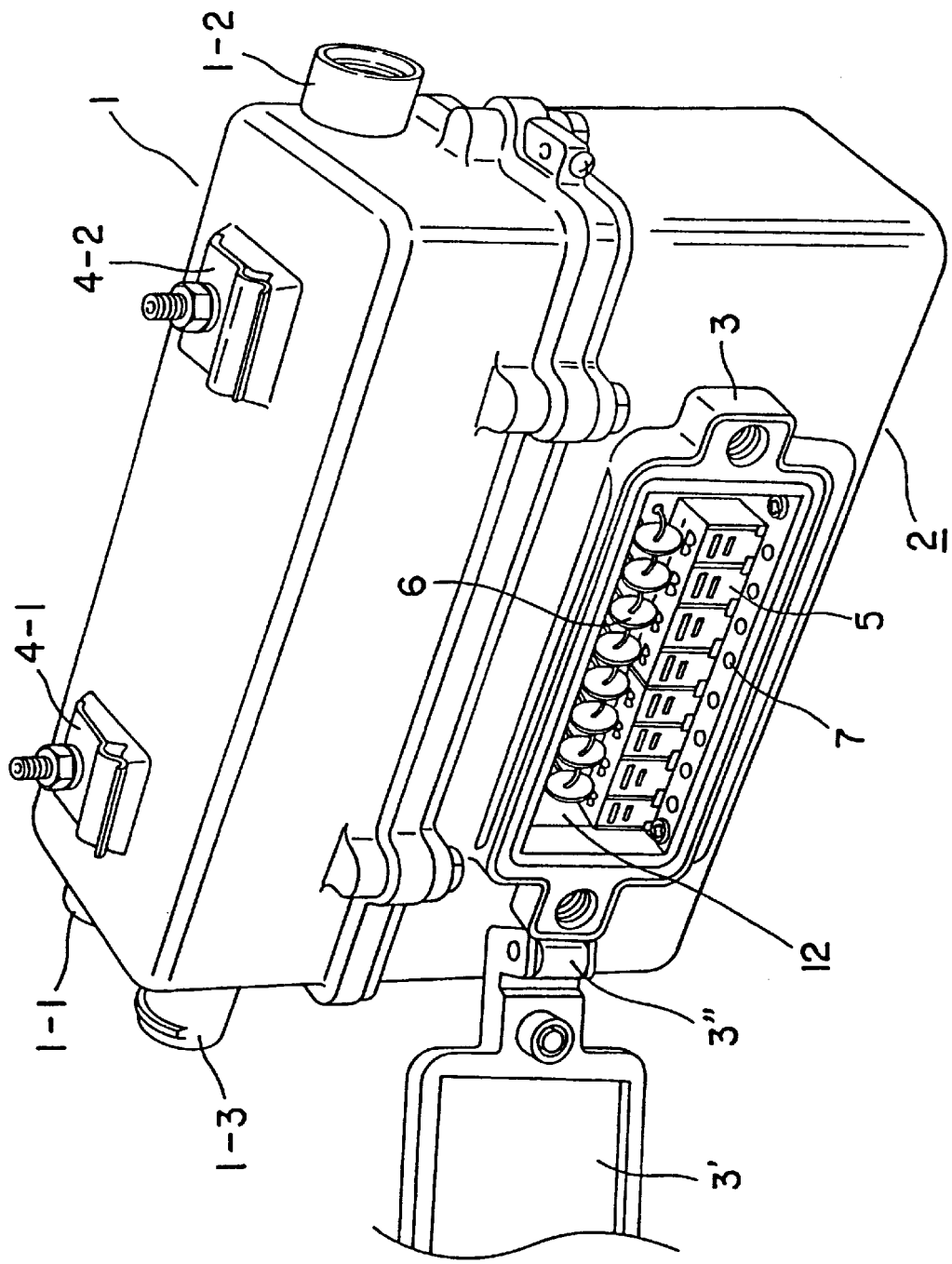
FIG. 8 is a perspective view of a configuration of a tap used in a conventional CATV system.
Figure 9:
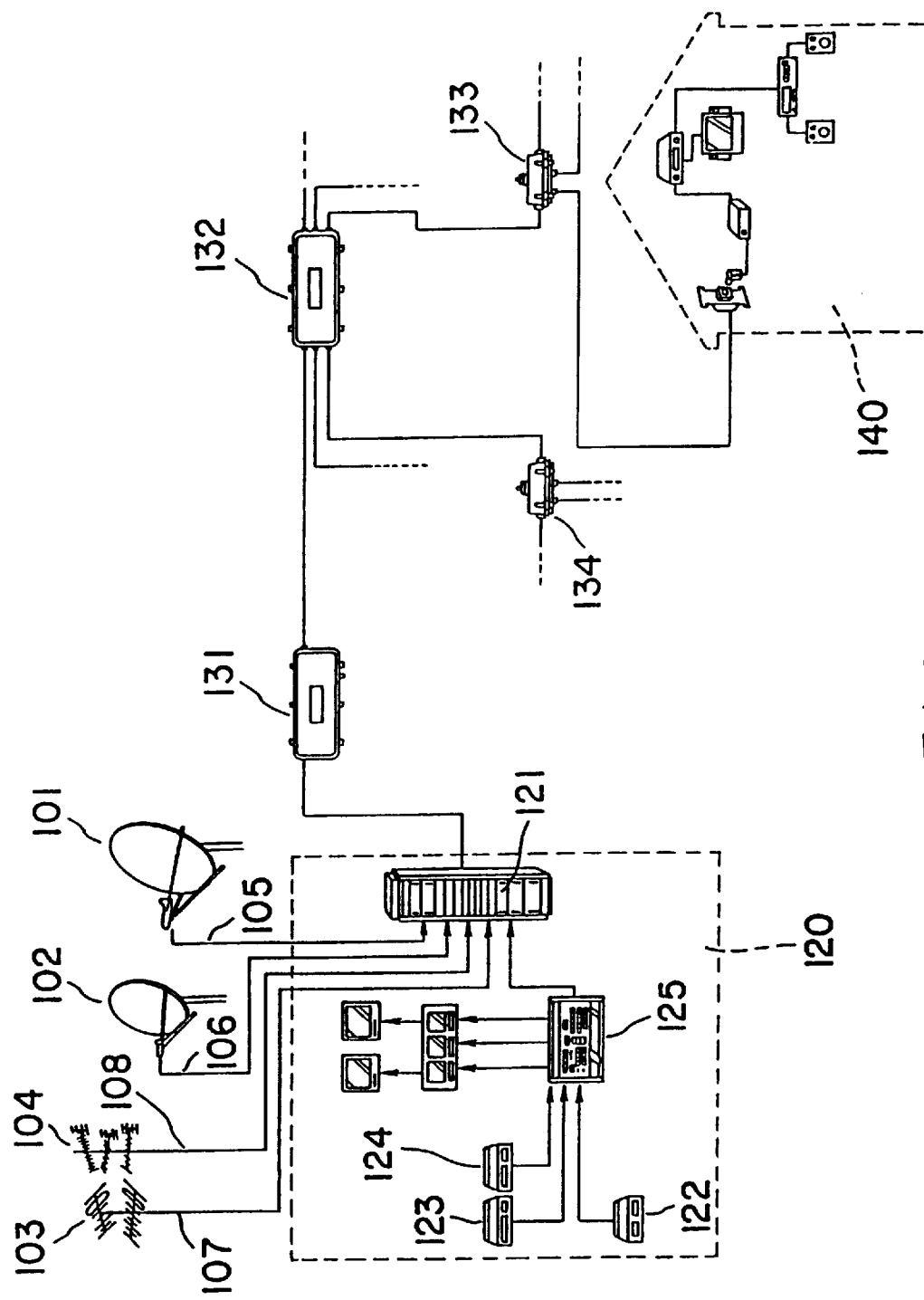
FIG. 9 is an explanatory view of a system using a tap-off used in a conventional CATV system.
Figure 10:
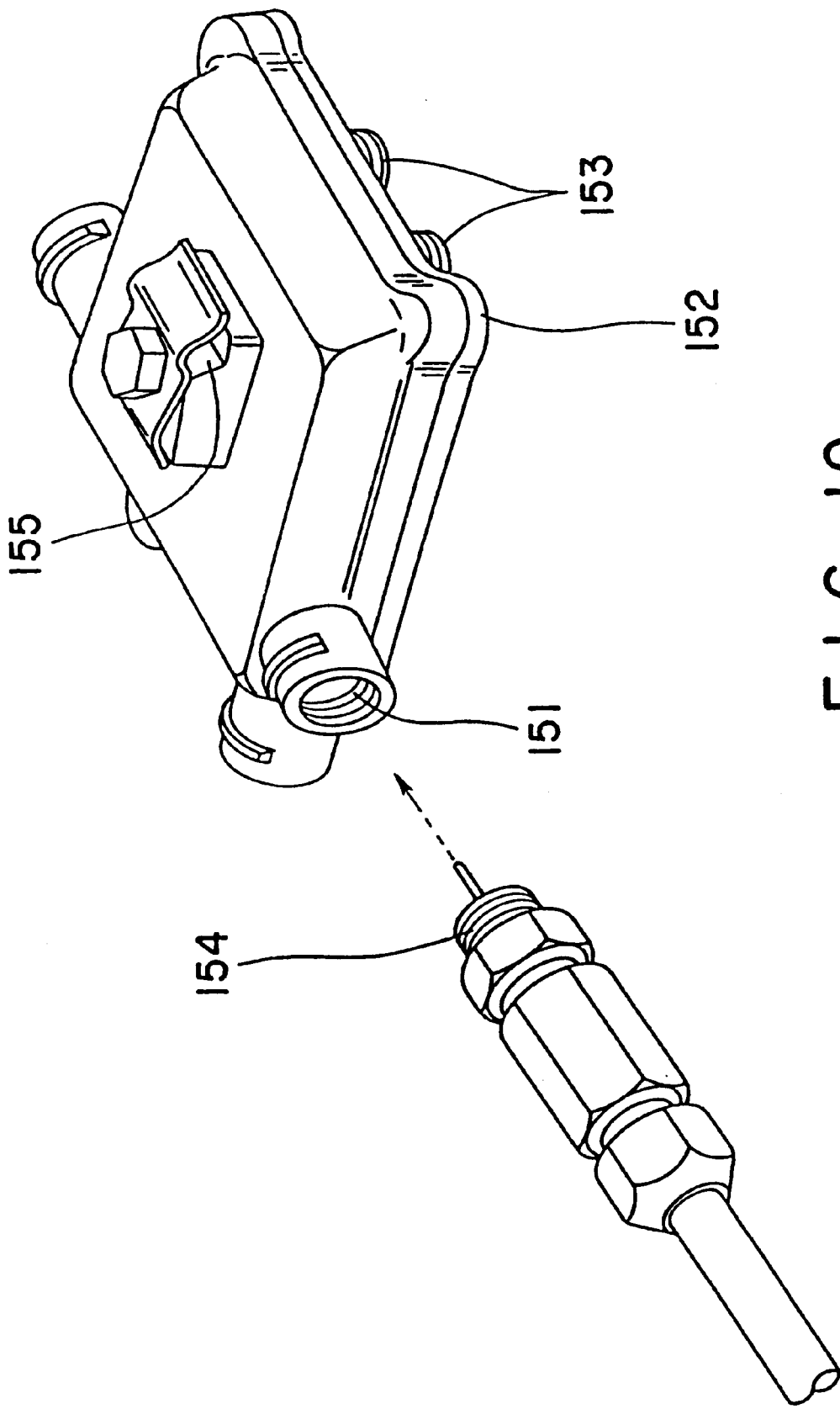
FIG. 10 is an explanatory view of a configuration of a tap used in a conventional CATV system.

FIG. 8 depicts a second embodiment of the present invention. As FIG. 8 shows, a fully united enclosure is provided with through-holes for output wires of current for telephones and high-frequency branch terminals. The enclosure further comprises a window 12 for operating the current-restricting elements, the connectors for current splitting and the like. In the present embodiment, this window 12 is provided on the lower side enclosure 2, not the upper side enclosure 1.

According to this configuration, waterproof packing for splitting wires can be provided around the perimeter of the window 12 and current-splitting wires fed through the window 12 to the terminals. As a result, the current-splitting wires will be prevented from clinging to the upper side enclosure 1 when the upper side enclosure 1 and the lower side enclosure 2 are separated.

Figure 11:
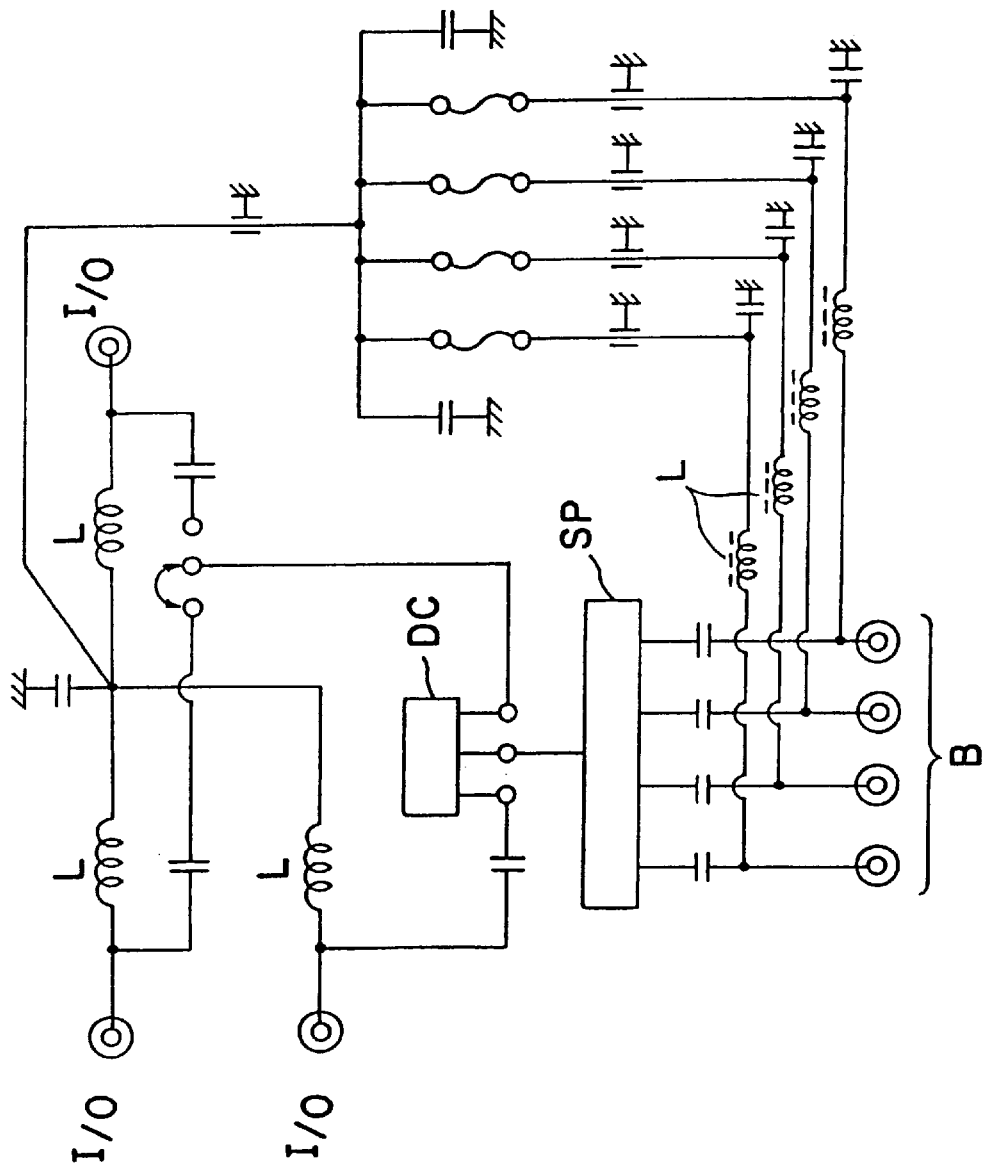
FIG. 11 is a block line diagram of a cable television/telephone tap generally used for multiplexing power for telephones onto a coaxial cable.

The embodiments described above illustrated a twisted pair wire pattern in which high-frequency signals are supplied by coaxial cables and current for telephones is supplied by current-splitting wires. However, the current for telephones can alternately be multiplexed onto the coaxial cables as in the conventional example shown in FIG. 11. In that case, since current-splitting wires do not have to be inserted, there is no need to provide through-holes on the same wall on which the branch terminals for high-frequency signals, on the upper side enclosure or the lower side enclosure, are provided.

Since the present invention has the configuration described above, the usable frequency band is as wide as a cable television frequency band, and the cable television/telephone tap of the present invention can therefore be provided at any given position on the signal path, supplying high-frequency signals and current for telephones to subscribers. Furthermore, either of the wiring operations can easily be performed on the ground, and a reliably waterproof cable television/telephone tap can be provided. Therefore, installation, expansion, modification, improvement, signal multiplexing and the like in/of signal circuits which use coaxial cables to transmit high-frequency signals and current for telephones, such as CATV, can be carried out quickly and economically.

Firstly, in a first aspect of the present invention, a cable television/telephone tap, having a usable frequency band which is roughly as wide as a cable television frequency band, can be provided at any given position on a signal path, and high-frequency signals and current for telephones can be supplied to subscribers. In addition, either of the wiring operations can easily be performed on the ground.

In another aspect of the present invention, a reliably waterproof cable television/telephone tap can be accomplished.

In another aspect of the present invention, the waterproof structure can be further simplified.

In another aspect of the present invention, the waterproof structure can be provided in a configuration which is more easily handled.

In another aspect of the present invention, a still more reliable waterproof structure can be achieved by the application of pressure.

In another aspect of the present invention, a waterproof structure and a magnetic shield can be combined.

In two further aspects of the present invention, the workability of a connection between wires for high-frequency signal and splitting wires for current for telephones can be improved.

In a final aspect, the present invention can be realized in a coaxial multiplexed system.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A cable television/telephone tap using coaxial cables to split high-frequency signals and current for telephones and supply said high-frequency signals and said current for telephone use to subscribers, said television/telephone tap comprising:

a plurality of enclosures which are combined together, said enclosures including an upper side enclosure and a lower side enclosure;

branch terminals of said high-frequency signals for said subscribers, said branch terminals being provided on a single wall of said lower side enclosure;

through-holes for inserting current-splitting wires which feed the current for telephones, said through-holes being provided on the same enclosure wall as said branch terminals; and a partition around said through holes in said enclosure wall so as to assist said enclosure in surrounding said through holes;

said upper enclosure having a circuit for splitting the high-frequency signals and the current for telephone from a signal supplied via a trunk cable;

said lower side enclosure having a first printed circuit board for the high-frequency signals and a second printed circuit board for the current for telephones;

said first printed circuit board and said second printed circuit board being respectively supplied with the high-frequency signals and the current for telephones from said upper side enclosure;

said lower side enclosure having a window, which has connectors for supplying the current for telephones and is electromagnetically sealed from the inside of said lower side enclosure, on a wall thereof;

said second printed circuit board being electromagnetically separated from said upper side enclosure and said first printed circuit board, and having a through capacitor to carry the current from telephones from said upper side enclosure to the second circuit board.

2. A cable television/telephone tap according to claim 1, further comprising:

a compressible filler in said through-holes.

3. A cable television/telephone tap according to claim 2, wherein said compressible filler comprises a polymeric compound.

4. A cable television/telephone tap according to claim 3, wherein said high polymer compound comprises silicon rubber which hardens at room temperature.

5. A cable television/telephone tap according to claim 4, further comprising:

a pressure board for applying pressure to said compressible filler.

6. A cable television/telephone tap according to claim 2, wherein said compressible filler comprises a polymeric compound into which a powdered magnetic substance has been scattered.

7. A cable television/telephone tap according to claim 1, further comprising:

a window for connecting said current-splitting wires, said window being provided on one of said enclosures different from the enclosure in which said through-holes for current-splitting wires are provided.

8. A cable television/telephone tap according to claim 1, further comprising:

a window for connecting said current-splitting wires, said window being provided on said enclosure in which said through-holes for current-splitting wires are provided.

* * * * *